United States Patent Office 2,932,144
Patented Apr. 12, 1960

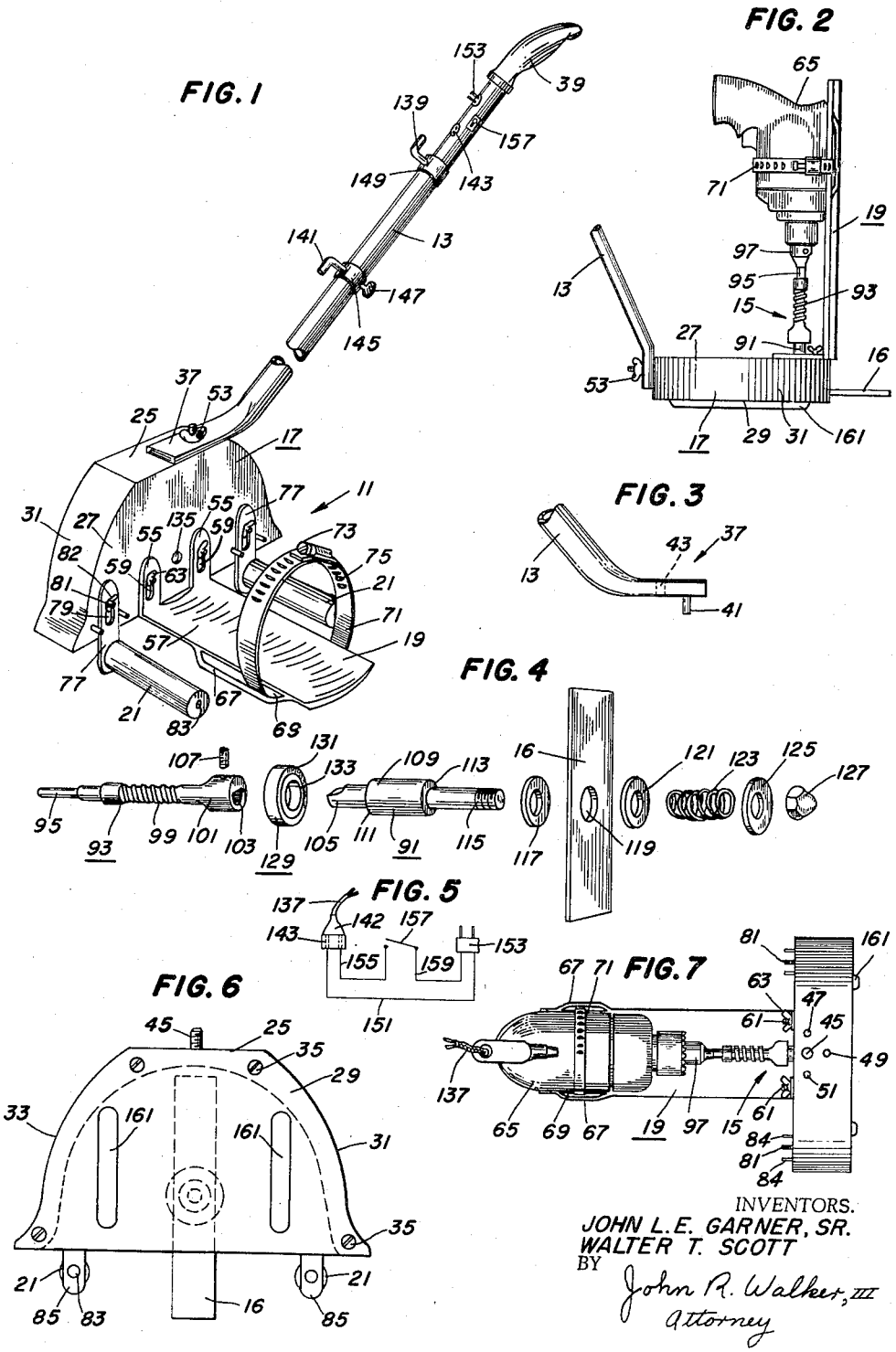

2,932,144

LAWN EDGE TRIMMER ATTACHMENT FOR A POWER DRILL

John L. E. Garner, Sr., and Walter T. Scott, Memphis, Tenn.

Application March 27, 1958, Serial No. 724,317

4 Claims. (Cl. 56—25.4)

This invention relates to lawn edge trimmers and, more particularly, to a lawn edge trimmer attachment for a power drill.

There have been numerous types of power-driven trimmers heretofore contemplated for trimming the edge of a lawn. Most of these trimmers have been driven by electric motors, the cost of which renders the trimmers very expensive.

Therefore, one of the important objects of the present invention is to provide a simple and inexpensive attachment which may be joined with a power drill, as the well-known hand type which is driven by an electrical motor, to provide a very efficient lawn edge trimmer. The advantages of the foregoing object are realized in the following theoretical case: A person who owns a power drill already and who desires a lawn edge trimmer can save himself a great deal of money by purchasing the trimmer attachment of the present invention and joining it with his drill which he already has. He has complete versatility since the power drill may be detached at any time and used for other purposes. On the other hand, if he had bought a conventional motor-driven edge trimmer, with the motor a permanent part thereof, it would have cost him a great deal more and he could not use the motor for any other purpose.

A further object is to provide in such a lawn edge trimmer attachment a convenient switch means for turning the power off and on without having to turn the drill switch off and on.

A further object is to provide novel means for taking up the slack in the cord of the drill.

A further object is to provide an effective means for selectively positioning the handle of the lawn edge trimmer.

A further object is to provide means for correcting for misalignment of the power drill and the shaft of the lawn edge trimmer attachment.

A further object is to provide improved means for conveying the lawn edge trimmer attachment comprising spaced skids mounted from the side of the attachment housing.

A further object is to provide a lawn edge trimmer attachment for a power drill comprising a carriage for the drill including a pair of ground engaging rollers, and an elongated handle attached to said carriage for pushing the carriage, a shaft rotatably mounted from said carriage, a blade fixedly mounted on said shaft adjacent one end of the shaft, the opposite end of said shaft being disposed for reception in the chuck of the drill carried by said carriage for rotation of said shaft carrying with it said blade in rotary motion.

A further object is generally to improve the design and construction of lawn edge trimmers and lawn edge trimmer attachments.

Other objects and many of the attendant advantages of this invention will be apparent from the following detailed description taken in conjunction with the accompanying drawings, in which:

Fig. 1 is a perspective view of the lawn edge trimmer attachment of the present invention shown with the handle in one of the selective positions and with parts removed for purposes of clarity.

Fig. 2 is a fragmentary side elevational view on a reduced scale of the lawn edge trimmer attachment illustrated in conjunction with a power drill with the handle of the attachment being shown in another of the selective positions and with parts removed for purposes of clarity.

Fig. 3 is a fragmentary side elevational view on an enlarged scale of the lower portion of the lawn edge trimmer handle.

Fig. 4 is an exploded view of the shaft of the lawn edge trimmer attachment and its associated parts.

Fig. 5 is a schematic view of the electrical system of the lawn edge trimmer attachment.

Fig. 6 is a side elevational view on an enlarged scale of the lawn edge trimmer attachment as viewed from the side opposite from that shown in Fig. 1 and with the handle being removed for the purposes of clarity.

Fig. 7 is a top-plan view on a reduced scale of the lawn edge trimmer attachment shown in conjunction with a power drill and with parts removed for the purposes of clarity.

Referring now to the drawings in which the various parts are indicated by numerals, the lawn edge trimmer attachment of the present invention comprises, in general, a carriage 11, a handle 13 removably connected thereto, a shaft 15 rotatably mounted from the carriage, and a blade 16 carried by the shaft.

Referring now specifically to carriage 11, the carriage comprises a housing 17, a cradle 19, and a pair of rollers 21 respectively rotatably mounted from the same side of the housing but on opposite sides of the cradle.

Housing 17 preferably includes a top 25, opposite spaced sides 27, 29 and opposite spaced end members 31, 33 depending from top 25. The housing has on bottom and sides 27, 29 and end members 31, 33 are interconnected adjacent the edges thereof, thereby forming a housing which is downwardly opening. Top 25, side 27, and end members 31, 33 are preferably formed of integral construction, as, for example, by casting, and side 29 is preferably removably attached to the other parts of the housing as by means of screws 35 extending through apertures in side 29 and into threaded apertures in the other parts of the housing. Additionally, end members 31, 33 are preferably, though not necessarily, of arcuate construction, as best shown in Figs. 1 and 6.

Handle 13 includes a flattened foot portion 37 adjacent the lower end thereof and a hand grip portion 39 adjacent the opposite or upper end thereof. Foot portion 37 is provided with a depending stud 41 adjacent the distal end thereof and a bore 43 extending through the foot portion inwardly of stud 41. Bore 43 is adapted to receive a threaded post 45 mounted on top 25 and upstanding therefrom. Stud 41 is adapted to project into one of holes 47, 49, 51 provided in top 25. Holes 47, 49, and 51 are disposed at 90-degree intervals. In other words, as best viewed in Fig. 7, an imaginary line through the center of hole 47 and the center of post 45 forms a 90-degree angle with an imaginary line through the center of hole 49 and the center of the post; and an imaginary line through the center of hole 51 and the center of post 45 forms a 90-degree angle with an imaginary line through the center of hole 49 and the center of the post. From the foregoing, it will be understood that handle 13 is adapted to be disposed in one of three selected positions—that is, the position shown in Fig. 1 in which stud 41 extends into hole 47, in the position shown in Fig. 2 in which the stud extends into hole 49, or into a position opposite from that shown in Fig. 1 in which the stud extends into hole 51. The importance of the particular positions of the handle will be more apparent in the description to follow of the operation of the device. It is deemed sufficient to say at this particular point that, having selected the particular position desired, a wing nut 53 is threadedly engaged on post 45 to anchor handle 13 onto housing 17.

Cradle 19 includes a pair of spaced and upstanding tabs 55 which are fixedly mounted adjacent one end of the main body 57 of the cradle, which main body is preferably arcuate in cross-section, as best shown in Fig. 1. Tabs 55 are respectively provided with slots 59 therethrough, which slots are adapted to receive respectively threaded studs 61 fixedly mounted from side 27 and projecting outwardly therefrom. Wing nuts 63 are respectively threadedly engaged on studs 61 and contact tabs 55 to anchor cradle 19 onto the side of housing 17 in the manner shown in Figs. 1, 2, and 7, wherein it will be seen main body 57 projects outwardly from housing 17 at substantially a 90-degree angle. It will be understood that cradle 19 may be adjusted vertically by virtue of the slots 59.

Lips 67 depend from main body 57 adjacent opposite edges thereof and are respectively provided with elongated openings 69 through which extend a circular band 71 that is preferably of the well-known adjustable type having a screw 73, the threads of which co-operate with slots 75 in the band to increase or decrease the diameter of the band depending upon the direction of the turning of screw 73.

The construction and mounting of rollers 21 are similar and, therefore, the description to follow of one is deemed sufficient. Each of rollers 21 is preferably rotatably mounted from side 27 by a bracket 77 having an elongated slot 79 therein which acts in conjunction with a threaded stud 81 projecting from side 27 and with a wing nut 82 in the same manner as heretofore described for the mounting of the cradle. A rod 83 is fixedly attached adjacent one end thereof to bracket 77 and extends outwardly therefrom with roller 21 being rotatably received on rod 83. A stationary pin 84 is fixedly mounted from side 27 on either side of bracket 77 to prevent any turning of the bracket relative to side 27. Bracket 77 extends below the point of attachment with rod 83 as at 85 so as to guide the lawn edge trimmer attachment along the edge of the sidewalk which will be more apparent in the description to follow of the operation of the device. It will be understood from the foregoing that rollers 21 may be vertically adjusted by virtue of the slots 79.

Referring now more specifically to shaft 15, the shaft is preferably an assembly of two parts—namely, a rigid rod 91 and a flexible alongated extension 93. A more detailed description of this construction is as follows: Flexible extension 93 includes a spindle 95 adapted to be received in the chuck 97 of the drill 65 in a conventional manner. Spindle 95 is fixedly attached in end-to-end relationship with one end of a flexible member 99, as a cable or the like, and the other end of member 99 is fixedly attached to the head 101 of flexible extension 93. Thus, it will be understood that flexible extension 93 comprises spindle 95, flexible member 99, and head 101 and that spindle 95 may be deflected somewhat relative to head 101 to correct for misalignment of the drill, as will be hereinafter more apparent. A half-cylindrical socket 103 is provided in the distal end of head 101, into which is received the end portion 105 of rigid rod 91, which end portion is a half-cylindrical construction adapted to be matingly engaged in socket 103 to prevent relative rotation of the two parts. End portion 105 is removably held in socket 103 by means of a set screw 107 provided in a threaded hole in head 101. An enlarged portion 109 is provided intermediate the ends of rigid rod 91 and shoulders 111, 113 are established at the opposite ends of the enlarged portion. The end of rigid rod 91 opposite from end portion 105 is threaded as at 115.

In assembling blade 16 with shaft 15, a washer 117 is placed over threaded end 115. Then the threaded end is placed through an aperture 119 of blade 16; after that, another washer 121 is placed over the threaded end; then a spring 123 is placed over the threaded end; next, still another washer 125 is placed over the threaded end; and, finally, a cap nut 127 is threadedly engaged on the threaded end to hold the parts together in assembled relationship. From the foregoing, it will be understood that spring 123 urges against washer 121, which, in turn, urges the blade 16 and washer 117 together with washer 117 abutting shoulder 113. The foregoing urging of the parts together causes frictional contact therebetween whereby when shaft 15 is turned during the operation of the device, which description will follow, the blade 16 is caused to rotate therewith. The combination of parts heretofore mentioned act as a clutch mechanism whereby, in the event that blade 16 is restrained for any reason, shaft 15 is permitted to turn relative to the blade. Shaft 15, carrying the assembly of parts heretofore described, is rotatably received in housing 17 by means of a bearing 129 in which shaft 15 is received. Bearing 129 is of conventional construction and includes an outer ring 131 rotatable relative to inner ring 133 by virtue of ball bearings or the like being received therebetween. In the construction of the attachment of the present invention, bearing 129 is mounted from housing 17 by outer ring 131 being fixedly mounted in an aperture 135 in side 27 as by a frictional fit, welding, or the like.

In assembling shaft 15 and its associated parts with housing 17, the parts to the right of the bearing 129 as viewed in Fig. 4 are assembled as heretofore described, side 29 is removed, end portion 105 is inserted through inner ring 133 with the portion 105 extending outside of housing 17, and then flexible extension 93 is placed onto rigid rod 91 and secured thereon by tightening set screw 107. Side 29 is then replaced and the device is ready for joining with a drill. In the assembled relationship of the attachment of the present invention as hereinabove described, it will be understood that the greater portion of blade 16 will be covered by housing 17 with only a portion of the blade extending below the housing, as best shown in Fig. 6.

In joining the drill 65 with the lawn edge trimmer attachment of the present invention, the drill is placed in cradle 19 in the manner best shown in Figs. 2 and 7 with the band 71 encircling the body of the drill and with the chuck 97 grasping spindle 95 in the conventional manner. Band 71 is then tightened around the drill by turning screw 73. It will be understood that cradle 19 should be adjusted to align roughly the chuck of the drill with shaft 15, but that it does not have to be in precise alignment since the flexibility of the shaft will compensate for any remaining misalignment.

The cord 137 of drill 65 is looped around a pair of oppositely extending hooks 139, 141 which are supported from handle 13 and the plug 142 of cord 137 is plugged into a female socket 143 mounted on handle 13. An important feature of the present invention resides in the means for taking up the slack in the cord 137 which is looped about hooks 139, 141 as above described. This means is accomplished by movably mounting one of hooks 139, 141. In the drawings, the lower hook, that is, hook 141, is shown as being movably mounted wherein it will be seen hook 141 is fixedly supported from a ring 145 which encircles handle 13. Ring 145 is slidably received on the handle and may be moved to any desired position therealong to take up the slack and is securable in such a position by a thumb screw 147. Thus, the thumb screw is threadedly engaged in a threaded hole in ring 145 with the end thereof contacting the handle to anchor the hook 141 at the desired position. The upper hook 139 is preferably fixedly secured to handle 13 as by means of a ring 149 attached to the handle.

Referring now specifically to the electrical circuit of the device of the present invention which is best illustrated in Fig. 5, one of the contacts of socket 143 is connected by a lead 151 to one of the contacts of a male socket 153 that is mounted on handle 13. The other contact of socket 143 is connected by a lead 155 to one contact of a circuit breaker type of switch 157 also mounted on handle 13. The other contact of switch 157 is connected to the other contact of socket 153 by a lead 159. Leads 151, 155, and 159 are preferably disposed in handle 13. From the foregoing, it will be understood that an extension cord, not shown, leading from a source of electricity, may be employed with the present invention by plugging socket 153 into the socket of the extension cord. Also, it will be understood that switch 157 provides a means for turning the drill 65 off and on without having to turn the switch of the drill off and on, thus providing a convenience to the operator who can easily reach switch 157 without having to bend down and turn the switch on and off on drill 65.

In using the device of the present invention, in some instances it is desirable to dispose handle 13 in the position shown in Fig. 2, as heretofore described, in which case the device is slidably supported from ground by spaced elongated skids 161. Power drill 65 is turned on causing rotation of blade 16, which trims the grass. If the device is used as a lawn edge trimmer, the handle is disposed in the position shown in Fig. 1 and the device is manually pushed with rollers 21 rolling along the sidewalk and extensions 85 depending along the edge of the sidewalk to guide the device therealong. It will be understood that the height of blade 16 relative to the ground and grass may be varied by changing the position of the rollers 21 in a manner as heretofore described. Additionally, it will be understood that the reversibility of handle 13 between the position shown in Fig. 1 and the position opposite from that shown provides means by which the device may be pushed in either direction along a given edge of the sidewalk. By being able to push the device in either direction along a given edge of the sidewalk, the cutting direction of the blade relative to the grass may be changed. For a clearer understanding of this, the following example is given: Let us assume that blade 16 is rotating in a counterclockwise direction, as viewed in Fig. 6. When the device is pushed to the left, as viewed in this figure, the blade moves downwardly in a cutting disposition onto the grass. When the device is pushed to the right, as viewed in this figure, the cutting is accomplished as the blade moves upwardly. Thus, the user of the device may prefer the first-mentioned movement to the left for ordinary cutting and the one to the right for so-called "trenching."

An additional benefit is accomplished by the reversible feature mentioned above in that in some instances, where there are obstructions which prevent cutting in spots, the only way to be able to reach these spots is to reverse the handle.

From the foregoing description, it will be apparent that a simple, inexpensive, and very efficient means is described for providing a lawn edge trimmer by using a conventional power drill in conjunction with the attachment of the present invention. It is further apparent that many advantages and features heretofore not present in previous lawn edge trimmers is provided.

Although the invention has been described and illustrated with respect to a preferred embodiment thereof, it is to be understood that it is not to be so limited since changes and modifications may be made therein which are within the full intended scope of this invention as hereinafter claimed.

We claim:

1. A lawn edge trimmer attachment for a hand power drill comprising a top, opposite spaced sides and opposite spaced end members depending from said top, said sides and end members being interconnected to provide an open-bottom housing, a cradle including upstanding tabs adjacent one end thereof, said tabs being respectively provided with elongated slots, fastening means mounted from one of said sides, said fastening means extending through said slots and contacting said tabs to adjustably anchor said cradle onto said housing, said cradle extending substantially perpendicular from said one side, lips depending from said cradle, said lips being respectively provided with elongated openings, a band extending through said openings and encircling said cradle whereby being adapted to fasten a hand power drill in said cradle, a pair of rollers adjustably mounted from said one side and disposed on opposite sides of said cradle, elongated skids mounted on the other of said sides, an elongated handle including a foot adjacent one end thereof, a stud depending from said foot, a threaded post upstanding from said top, said foot being provided with a bore removably receiving said post, said top being provided with holes spaced around said post and adapted to selectively receive said stud for disposing said handle at selective positions relative to said housing, a nut threadedly engaged on said post to anchor said handle to said housing in any of said selective positions, at least one of said positions being adapted for said housing to be supported from the ground by said rollers with said handle being in position for manual pushing thereof, at least another of said positions being adapted for said housing to be supported from the ground by said skids with said handle being in position for manual pushing thereof, a pair of hooks mounted on said handle for looping the cord of the power drill therearound, at least one of said hooks being movable away from the other hook to a selected position whereby providing means for taking up the slack in the cord of the drill, a shaft including a rigid rod and an elongated extension fixedly secured in end-to-end relationship to said rigid rod, said rod being rotatably mounted from said housing, a blade mounted on said rod in said housing and extending below said housing, said extension being unobstructed adjacent its end remote from said rod and being arranged to be detachably received in the chuck of a hand power drill for the rotation of said shaft by said drill carrying with it said blade in rotating motion, said extension being flexible whereby being adapted to correct for misalignment of the power drill.

2. The structure according to claim 1 including an electrical wiring system mounted from said handle adjacent the upper end thereof, said system including a plug for making a connection with the cord of the drill, an additional plug for making a connection with an outside source of electricity, an electrical switch, and leads connecting said plugs and said switch in series whereby means is provided for controlling the flow of electrical current to the drill.

3. A lawn edge trimmer attachment for a hand power drill comprising a top, opposite spaced sides and opposite spaced end members depending from said top, said sides and end members being interconnected to provide an open-bottomed housing, a cradle including upstanding tabs adjacent one end thereof, said tabs being respectively provided with elongated slots, fastening means mounted from one of said sides, said fastening means extending through said slots and contacting said tabs to adjustably anchor said cradle onto said housing, said cradle extending substantially perpendicular from said one side, lips depending from said cradle, said lips being respectively provided with elongated openings, a band extending through said openings and encircling said cradle whereby being adapted to fasten a hand power drill in said cradle, a pair of ground engaging rollers adjustably mounted from said one side and disposed on opposite sides of said cradle, an elongated handle including a foot adjacent one end thereof, a stud depending from said foot, a threaded post upstanding from said top, said foot being provided with a bore removably receiving said post, said top being provided with holes spaced around said post and adapted to selectively receive said stud for disposing said handle at selective positions relative to said housing, a nut threadedly engaged on said post to anchor said handle to said housing in any of said selective positions, a pair of hooks mounted on said handle for looping the cord of the power drill therearound, at least one of said hooks being movable away from the other hook to a select position whereby providing means for taking up the slack in the cord of the drill, a shaft including a rigid rod and an elongated extension fixedly secured in end-to-end relationship to said rigid rod, said rod being rotatably mounted from said housing, a blade mounted on said rod in said housing and extending below said housing, said extension being unobstructed adjacent its end remote from said rod and being arranged to be detachably received in the chuck of a hand power drill for the rotation of said shaft by said drill carrying with it said blade in rotating motion, said extension being flexible whereby being adapted to correct for misalignment of the power drill.

4. A lawn edge trimmer attachment for a hand power drill comprising a top, opposite spaced sides and opposite spaced end members depending from said top, said sides and end members being interconnected to provide an open-bottomed housing, a cradle including upstanding tabs adjacent one end thereof, said tabs being respectively provided with elongated slots, fastening means mounted from one of said sides, said fastening means extending through said slots and contacting said tabs to adjustably anchor said cradle onto said housing, said cradle extending substantially perpendicular from said one side, lips depending from said cradle, said lips being respectively provided with elongated openings, a band extending through said openings and encircling said cradle whereby being adapted to fasten a hand power drill in said cradle, a pair of rollers adjustably mounted from said one side and disposed on opposite sides of said cradle, elongated skids mounted on the other of said sides, an elongated handle coupled to said housing for the manual pushing thereof, a pair of hooks mounted on said handle for looping the cord of the power drill therearound, at least one of said hooks being movable away from the other hook to a selected position whereby providing means for taking up the slack in the cord of the drill, a shaft including a rigid rod and an elongated extension fixedly secured in end-to-end relationship to said rigid rod, said rod being rotatably mounted from said housing, a blade mounted on said rod in said housing and extending below said housing, said extension being unobstructed adjacent its end remote from said rod and being arranged to be detachably received in the chuck of a hand power drill for the rotation of said shaft by said drill carrying with it said blade in rotating motion, said extension being flexible whereby being adapted to correct for misalignment of the power drill.

References Cited in the file of this patent

UNITED STATES PATENTS

| | | |
|---|---|---|
| 2,161,357 | Kaplan | June 6, 1939 |
| 2,263,431 | White | Nov. 18, 1941 |
| 2,540,616 | Hasslacher | Feb. 6, 1951 |
| 2,629,220 | Grieder | Feb. 24, 1953 |
| 2,708,335 | Newton | May 17, 1955 |
| 2,722,095 | Farney | Nov. 1, 1955 |
| 2,827,748 | Simpson | Mar. 25, 1958 |
| 2,832,184 | Beuerle | Apr. 29, 1958 |